… ….

United States Patent [19]

Kurita

[11] Patent Number: 4,773,156

[45] Date of Patent: Sep. 27, 1988

[54] APPARATUS FOR SECURING PARTS

[75] Inventor: Toshinori Kurita, Aichi, Japan

[73] Assignee: Toyoda Gosei Co., Ltd., Nishikasugai, Japan

[21] Appl. No.: 907,824

[22] Filed: Sep. 16, 1986

[30] Foreign Application Priority Data

Sep. 18, 1985 [JP] Japan .................................. 60-207413
Jun. 25, 1986 [JP] Japan .................................. 61-14906

[51] Int. Cl.[4] .......................................... B23Q 41/02
[52] U.S. Cl. ..................................... 29/783; 29/33 K; 29/787; 29/795; 29/822; 198/339.1
[58] Field of Search ............... 29/33 K, 783, 787, 795, 29/809, 813, 816, 818, 822; 198/339.1, 468.2, 470.1, 535; 414/222

[56] References Cited

U.S. PATENT DOCUMENTS

| 3,015,117 | 1/1962 | Braendel et al. | 29/783 X |
| 3,460,217 | 8/1969 | Leistner | 29/809 X |
| 4,172,514 | 10/1979 | Shantz et al. | 198/470.1 |
| 4,532,706 | 8/1985 | Horn | 29/809 |
| 4,569,116 | 2/1986 | Enterkin | 29/783 X |

FOREIGN PATENT DOCUMENTS 44-18194 8/1969 Japan ..................... 29/783

Primary Examiner—Howard N. Goldberg
Assistant Examiner—Taylor J. Ross
Attorney, Agent, or Firm—Cushman, Darby & Cushman

[57] ABSTRACT

In an apparatus for securing parts to an assembly body, a part conveyor means receives a plurality of parts arranged on a lot basis from a part storage. The part conveyor means is moved by the arm of the apparatus for driving parts up to the proximity of the assembly body. Since the arm of the apparatus for securing parts is equipped with a part securing means, the part securing means receives the parts from the part conveyor means individually a plurality of times and secures the parts to the assembly body.

11 Claims, 9 Drawing Sheets

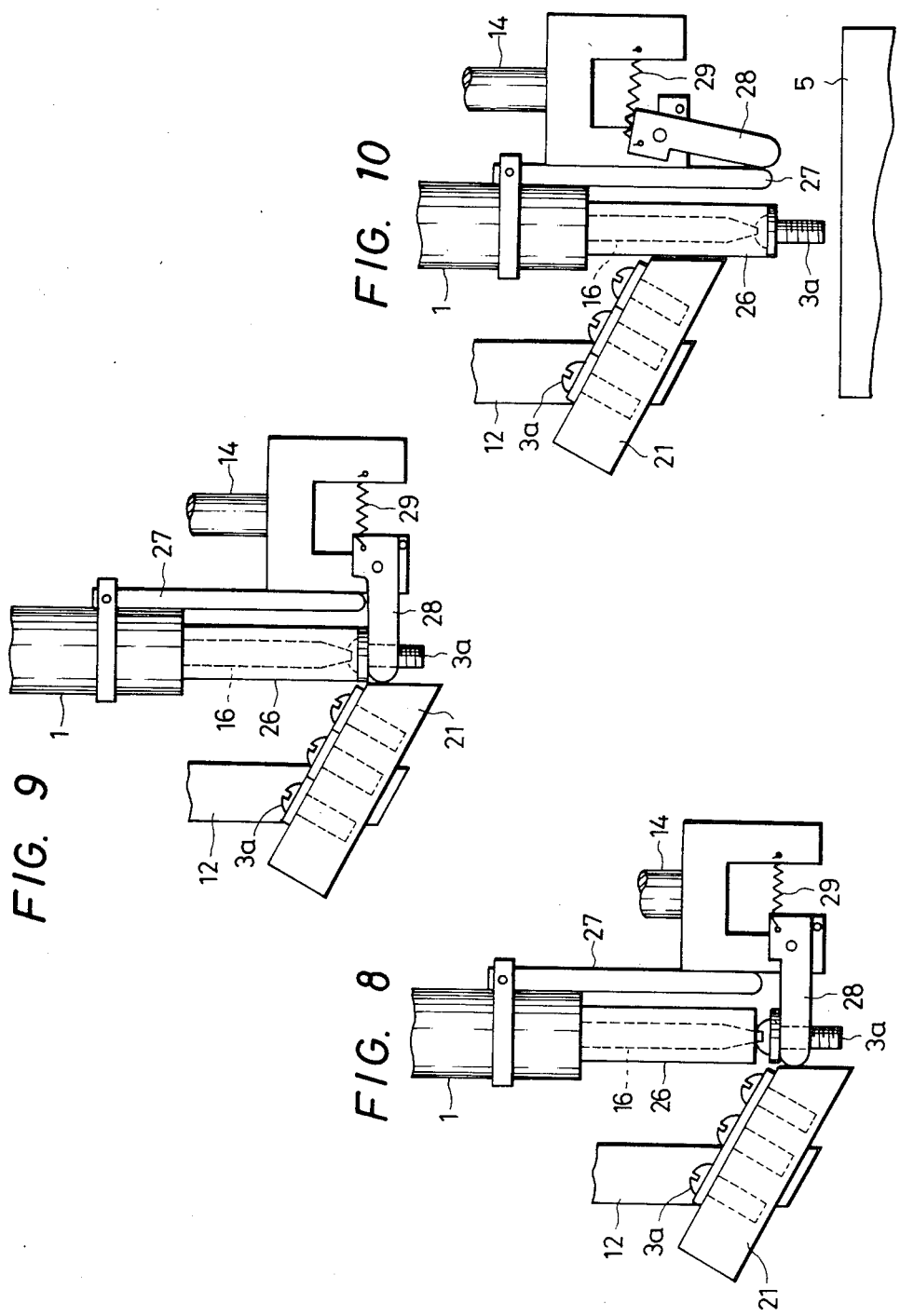

4,773,156

APPARATUS FOR SECURING PARTS

BACKGROUND OF THE INVENTION

This invention relates to an apparatus for securing parts to an assembly by making use of a carrying means operated automatically under the control of a computer, a sequence control and the like.

Heretofore, carrying means have been utilized to drive parts when various assemblies are fabricated so that productivity can be increased.

As shown in FIGS. 1 and 2, the apparatus for driving parts comprises a carrying means 54, a tool gripping means 55 attached to the front end of the arm 52 of the carrying means 54, a part storage 56 installed within the range of a distance the tool gripping means 55 can cover, and a plurality of tools 58 for respectively receiving parts 57 and being kept on standby until carried by the arm 52.

The operation of the apparatus will subsequently be described. The arm 52 is first moved by a transfer mechanism 53 to a position A where the tool is received thereby as shown by an alternate long and two short dashes line of FIG. 1, whereby the tool gripping means 55 attached to the front end thereof is allowed to grip one of the tools 58 which are on standby in the storage 56.

The arm 52 is further moved to a position B where the part is driven and the tool 58 is moved in close to a site of an assembly body 59 to which the part is secured. The tool 58 is then used to secure the part 57 to the assembly body 59 after the part 57 is made to abut against the site of the assembly body 59 shown in FIG. 2.

The carrying means 54 again operates so as to move the arm 52 to the position A where the part is received after the first part is driven, thus allowing the tool gripping means 55 to grip the next tool 58 supplied with the part 57. Then the arm 52 is moved to the position B where the part 57 is secured thereto.

The parts 57 of the same kind or different kinds are successively secured to the assembly body 59 as the arm 52 of the carrying means 54 reciprocates likewise.

As shown in FIG. 3, the tool 58 is so arranged as to be gripped by the tool gripping means 55 through a gripping member 60, and to be moved up and down by an air cylinder 64 provided at its upper portion. When the part 57 is fitted into the supply aperture 62 of a supply means 61 provided under the gripping member 60, the actuating means 63 of the tool 58 operates, so that the part 57 is secured to the assembly body 59.

Parts may be driven at a substantially low cost by means of the above apparatus. While special emphasis is increasingly placed on improvement in part driving productivity, however, the following problem has been posed.

Since the carrying means 54 is used to transport the parts 57 one after another from the position A where the tool is received to the other B where the part is secured to the assembly body 59, the reciprocating time required for the robot to reciprocate between the above two positions becomes longer than what is actually required for it to drive the part 57 and, when it is attempted to shorten the part driving time, the above reciprocating time will inevitably become rate-determining.

SUMMARY OF THE INVENTION

An object of the present invention is provide an apparatus for securing parts to an assembly body by making use of a carrying means so as to prolong actual working time for securing the parts thereto.

The apparatus for securing parts to an assembly body according to the present invention comprises a part conveyor means for receiving a plurality of parts from a part storage and conveying the parts arranged on a lot basis close to an assembly body and a part securing means for securing the parts thus conveyed by the part conveyor means to the assembly body individually, the part conveyor and securing means being fitted to the arm of the apparatus for securing parts to the assembly body, so that the above problem is solved thereby.

The part conveyor means receives a plurality of parts arranged on a lot basis from the part storage. The part conveyor means is moved by the arm of the apparatus for driving parts up to the proximity of the assembly body.

Since the arm of the apparatus for securing parts is equipped with the part securing means, the part securing means receives the parts from the part conveyor means individually a plurality of times and secures the parts to the assembly body. In consequence, the number of times that the arm reciprocates between the part storage and the assembly body decreases in inverse proportion to the number of parts conveyed by the part conveyor means. Productivity is thus improved to the extent of the above decreased number of times.

BRIEF DESCRIPTION OF THE DRAWINGS

FIG. 8 is a partial side view showing a process prior to that in which parts are attracted by the part securing means of another apparatus embodying the present invention.

FIG. 9 is a partial side view showing a process in which parts are attracted by the same.

FIG. 10 is a partial side view showing a process in which parts are secured by the same.

DESCRIPTION OF THE PREFERRED EMBODIMENTS

Referring now to FIGS. 4–7, an apparatus for securing parts embodying the present invention will be described.

There are used screw bolts 3a as parts 3 and drivers 1 as securing means according to this embodiment.

Figure 1:
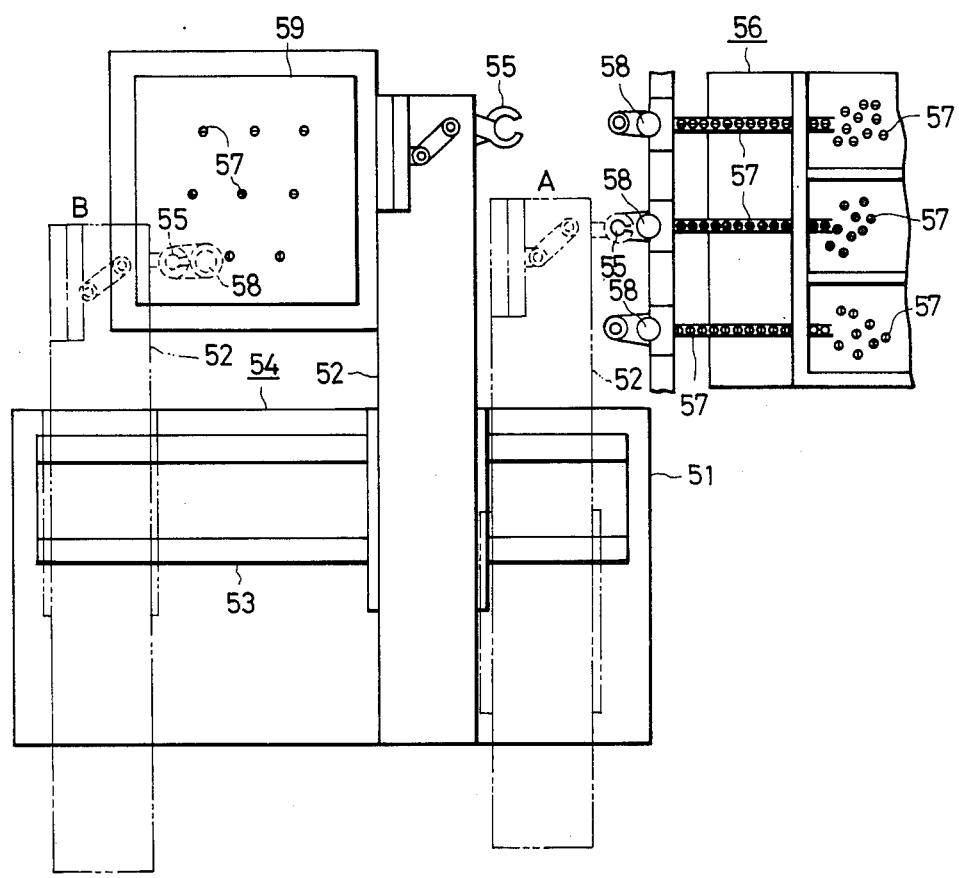
FIG. 1 is a schematic plan view of a conventional apparatus.
Figure 2:
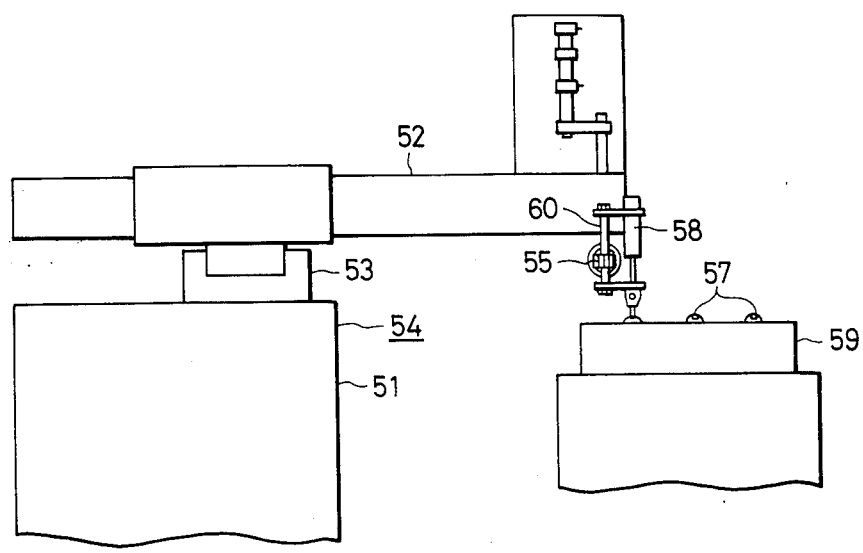
FIG. 2 is a schematic side view of the same.
Figure 3:
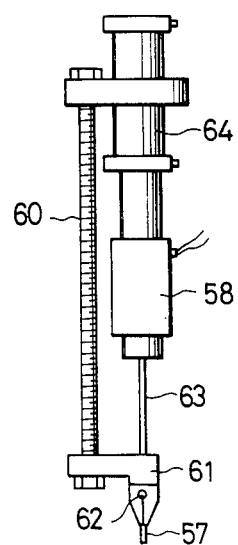
FIG. 3 is a side view of the part securing means of the same.
Figure 4:
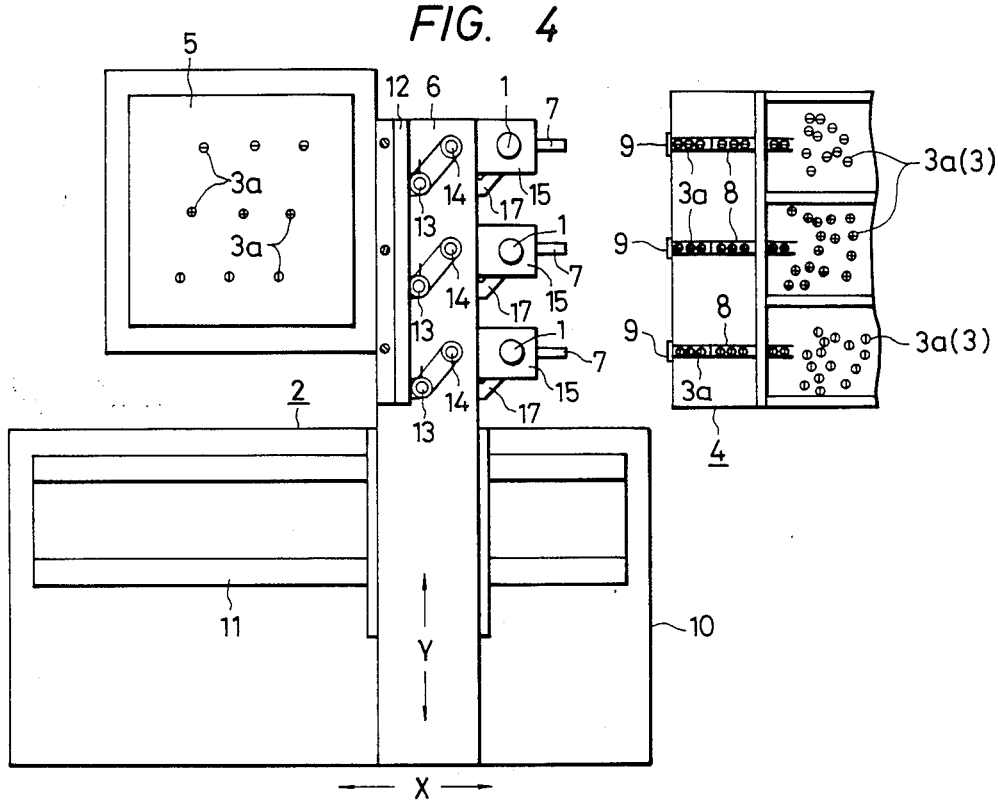
FIG. 4 is a schematic plan view of the principal portion of an embodiment of the present invention.
Figure 5:
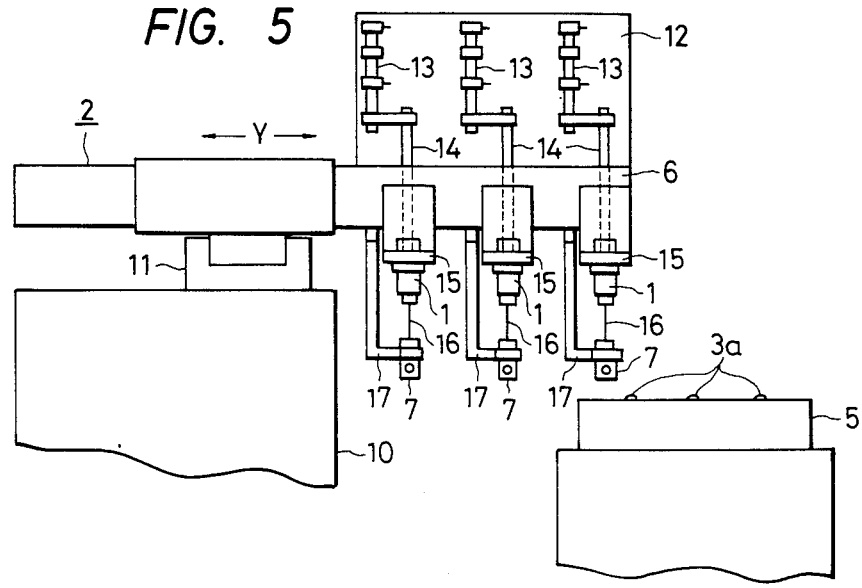
FIG. 5 is a schematic side view of the same.

As shown in FIGS. 4 and 5, the apparatus for securing parts in this embodiment comprises a storage 4 for storing a number of screw bolts 3a, conveyor means 7 for carrying a plurality of screw bolts 3a on a lot basis from the storage 4 to an assembly body 5, and a robot 2 as a part securing means for tightening the screw bolts 3a carried by the conveyor means 7 one after another onto the assembly body 5, the robot 2 being equipped with screwdrivers 1 each for tightening the screw bolts 3a.

The storage 4 is equipped with supply means 8 for supplying the screw bolts 3a arranged in a row to the conveyor means 7 and stoppers 9 each installed at their front ends for preventing the screw bolts 3a from slipping off the front ends.

The robot 2 comprises a transfer mechanism 11 mounted on a base 10 and an arm 6 which can be moved back and forth by the transfer mechanism 11 in the directions of arrows X and Y.

A first support member 12 is fixed to one side of the arm 6 and three air cylinders 13 are fixed to the first support member 12. A second support member 14 is fixed to each air cylinder 13 at its upper end and a driver 1 is coupled to the lower end of the second support member 14 through a guide member 15. Accordingly, the driver 1 can be moved up and down by actuating the air cylinder 13.

The guide member 15 also acts as a guide for allowing the driver 1 to move up and down smoothly.

Figure 6:
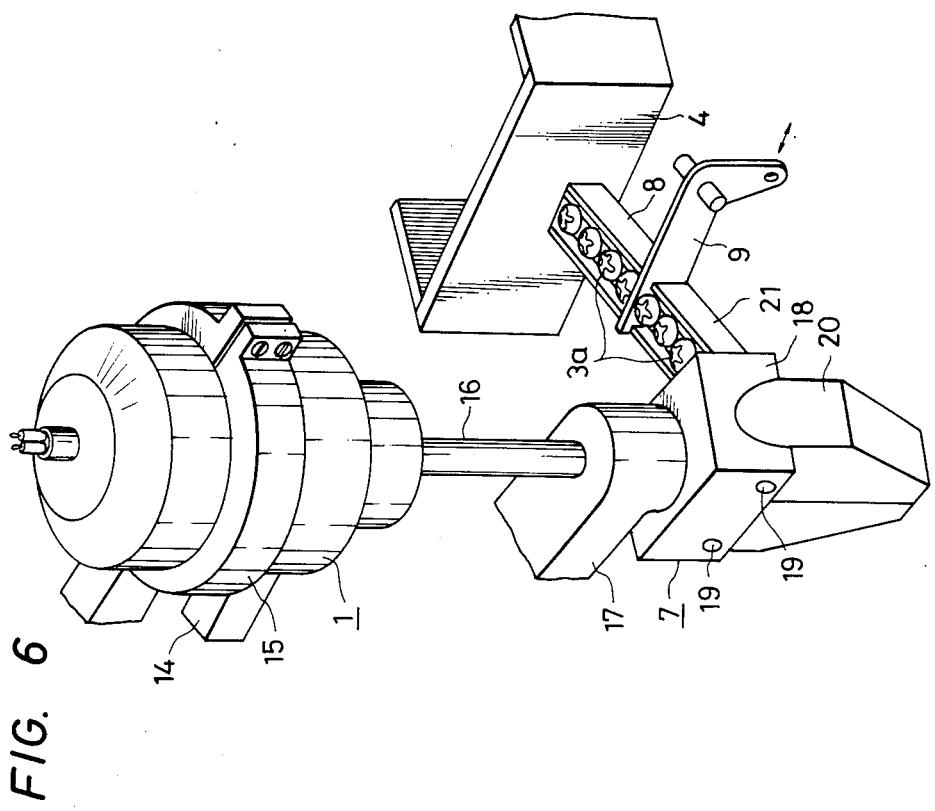
FIG. 6 is a perspective view of a part securing means.

Further, as shown in FIGS. 5 and 6, each conveyor means 7 for bunching off the screw bolts 3a and carrying one of them to the proximity of the assembly body 5 is supported by the arm 6 of the robot 2 through a third support member 17.

Figure 7:
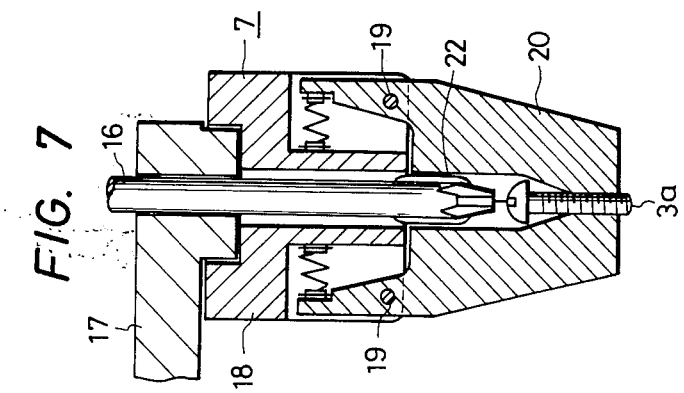
FIG. 7 is a vertical sectional view of the principal portion of a part conveyor means.

The conveyor means 7 is, as shown in FIGS. 6 and 7, fixed to the front end of the third support member 17 with a screw and comprises a chuck support member 18, the actuator means 16 of the driver 1 being insertable into the center thereof, a single split chuck 20 rotatably fitted to the lower end of the chuck support member 18 through pins 19, and a lineup means 21 for arranging the screw bolts 3a in a line to feed them into the chuck 20 one after another.

The screw bolts 3a are supplied into the chuck 20 through a supply port 22 one after another when the actuator means 16 is moved up and the actuator means 16 is moved down after the screw bolt 3a is supplied.

Only a fixed number of screw bolts 3a are allowed to line up in the lineup means 21. The stopper 9 of the storage 4 is opened to make the screw bolts 3a move from the supply means 8 into the lineup means 21 and closed to supply a fixed number of screw bolts 3a into the lineup means 21.

As shown in FIGS. 4 and 5, the assembly body 5 is placed close to the supply means 8 to the extent that the driver 1 attached to the arm 6 of the robot 2 is movable. FIG. 4 shows a model in which nine screw bolts 3a of three different kinds forming one lot are indicated relative to the assembly body 5.

By the one lot is meant that it is a unit of screw bolts 3a for use in a cycle of process starting with the reception of the screw bolts 3a by the conveyor means 7 from the supply means 8 and ending with the return of the conveyor means 7 to the supply means 8 after all of the screw bolts 3a thus arranged have been secured to the assembly body 5 thereby. In that case, a plurality of screw bolts 3a of one kind or otherwise more than one screw bolt 3a of different kinds are employed, the total number thereof being determined depending on the pertinent assembly body 5.

When screw bolts 3a of different kinds are secured to the assembly body 5, the whole number of screw bolts 3a to be secured thereto should preferably be treated as a lot, though minimum two screw bolts per kind are set as a lot.

Subsequently, the function and effect of the embodiment of the present invention will be described.

The robot 2 is so operated as to move the arm 6 up to a position close to the supply means 8 simultaneously with the actuation of the air cylinders 13, so that the three lineup means 21 are moved close to the three supply means 8, respectively.

At the point of time that each lineup means 21 has been moved close to the supply means 8, each stopper is turned so that the supply means 8 is made to communicate with the lineup means 21. Subsequently, the screw bolts 3a are caused to slide on the tilted supply means 8 and supplied to the lineup means 21. When the stopper 9 is turned again after the screw bolts 3a are supplied to the lineup means 21, three screw bolts 3a are supplied to the lineup means 21 and screw bolt supply operation is thus completed.

The arm 6 and the air cylinder 13 are so operated as to move the driver 1 to close to the assembly body 5 and make the center of the chuck 20 abut against the intended site of the assembly body 5. The driver 1 is then slightly raised once to supply one screw bolt 3a into the chuck 20 and, while the actuator means 16 is turned downward, the screw bolt 3a is successfully secured to the assembly body 5. The above series of operations are simultaneously carried out with the three drivers 1 and, when the upward and downward operation of the driver 1 is repeated three times, one cycle of part securing operation is completed. The instructions as to the above operation are given by the program fed to the robot 2 or a separate control (not shown).

The nine screw bolts 3a of three different kinds are thus completely secured through the first reciprocation of the arm 6. In other words, a conventional apparatus has to move back and forth nine times to secure such screw bolts, whereas the apparatus according to this embodiment can secure the screw bolts through only one round of the reciprocation thereof. Consequently, it becomes possible to reduce not only the the time required for securing parts to such an assembly but also the energy necessary for moving the arm 6, i.e., the margin of that time is utilizable for securing more parts and thus increasing the productivity of the part securing work.

There will be shown another part securing means embodying the present invention.

As shown in FIGS. 8-10, a suction pipe 26 for sucking screw bolts 3a as parts is attached to the actuator means 16 of the driver 1 as a part securing means. Moreover, four screw bolts 3a as a lot are individually supplied to the lower portion of the actuating means 16 of the driver 1 one after another and supported by a support piece 28.

The lineup means 21 and the support piece 28 are supported by the driver 1 and the arm (not shown) of the robot through the first support member 12 and the second support member 14, respectively.

When the screw bolt 3a is secured to the assembly body 5, the driver 1 is slightly lifted first as shown in FIG. 8 to form a gap between the support piece 28 and the suction pipe 26 and the screw bolt 3a is supplied from the lineup means 21 into the gap.

The driver 1 is lowered as shown in FIG. 9 and a drop bar 27 attached to the driver 1 is also lowered. The front end of the drop bar 27 is caused to abut against a support piece 28, which turns as shown in FIG. 10 and causes the screw bolt 3a to abut against the pertinent site of the assembly body 5. When the actuator means 16 is operated in that state, the screw bolt 3a is completely secured to the assembly body 5.

When the driver 1 is subsequently lifted up, the drop bar 2 is also lifted up and the support piece 28 is returned to the original position by the action of a spring 29. The repetition of the above operation may cause the four screw bolts 3a as a lot to be secured to the assembly body 5.

The apparatus as the second example is thus capable of demonstrating the functions and effects similar to those demonstrated by the first example to ensure that the axes of the screw bolt 3a and the driver 1 can be alighned to a greater extent. It is unnecessary to attach the drop bar 27 to the driver 1 in this embodiment, provided that the support piece 28 can be lowered by the suction pipe 26.

Referring to FIGS. 11-14, still another part securing means embodying the present invention will subsequently be described.

Figure 11:
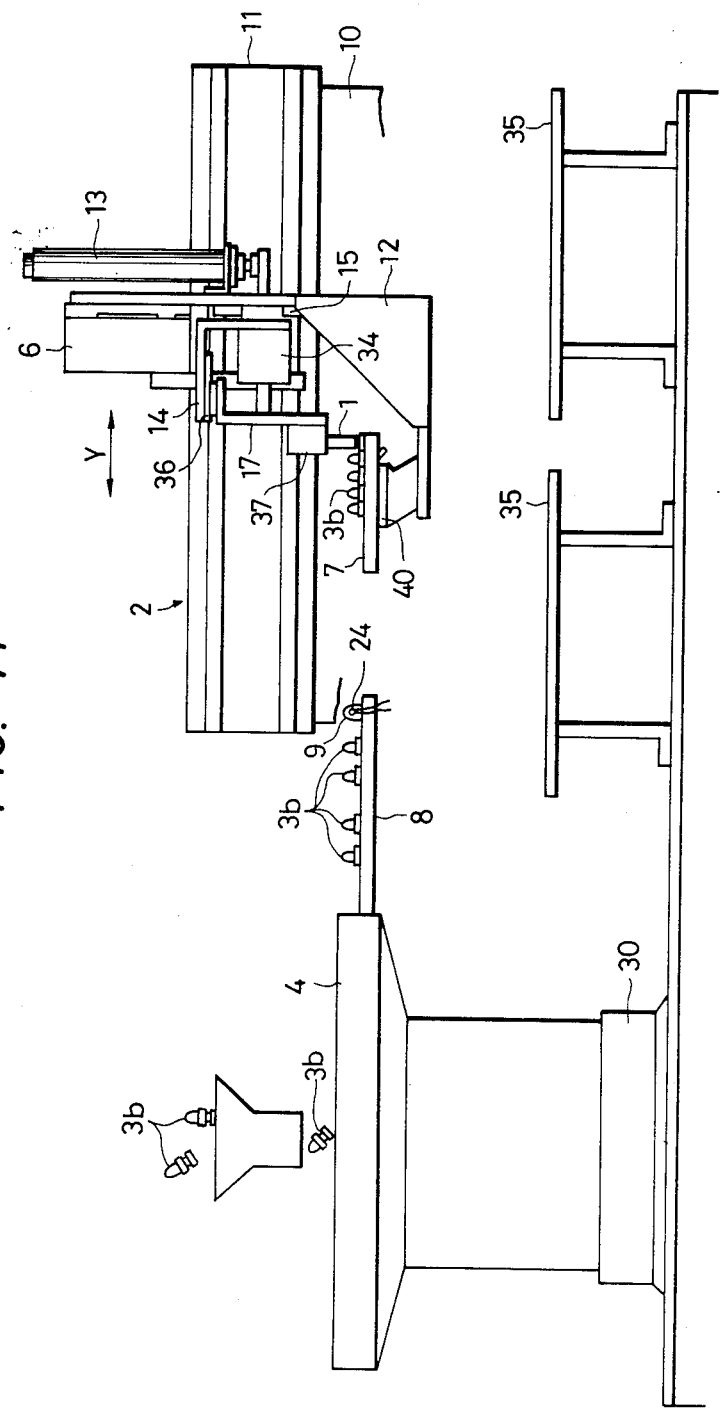
FIG. 11 is a side view of the principal portion of still another apparatus embodying the present invention.

As shown in FIG. 11, clips 3b as parts 3 are supplied to the storage 4 equipped with a vibrator 30 on its bottom and then supplied from the storage 4 to the groove-shaped rolling supply means 8 one after another in a row because of the vibration of the vibrator 30. A counter 24 and the stopper 9 are installed at the front end of the supply means 8, the counter 24 being used to count a predetermined number of clips 3b. When the counter 24 has counted the predetermined number thereof, the stopper 9 operates.

The robot 2 comprising the base 10, the transfer mechanism 11 installed on the surface of the base 10 and the arm 6 movable on the transfer mechanism 11 in the direction of the arrow Y is installed in front of (on the right-hand side of FIG. 11) the supply means 8 as an apparatus proper for automatically securing parts.

Figure 12:
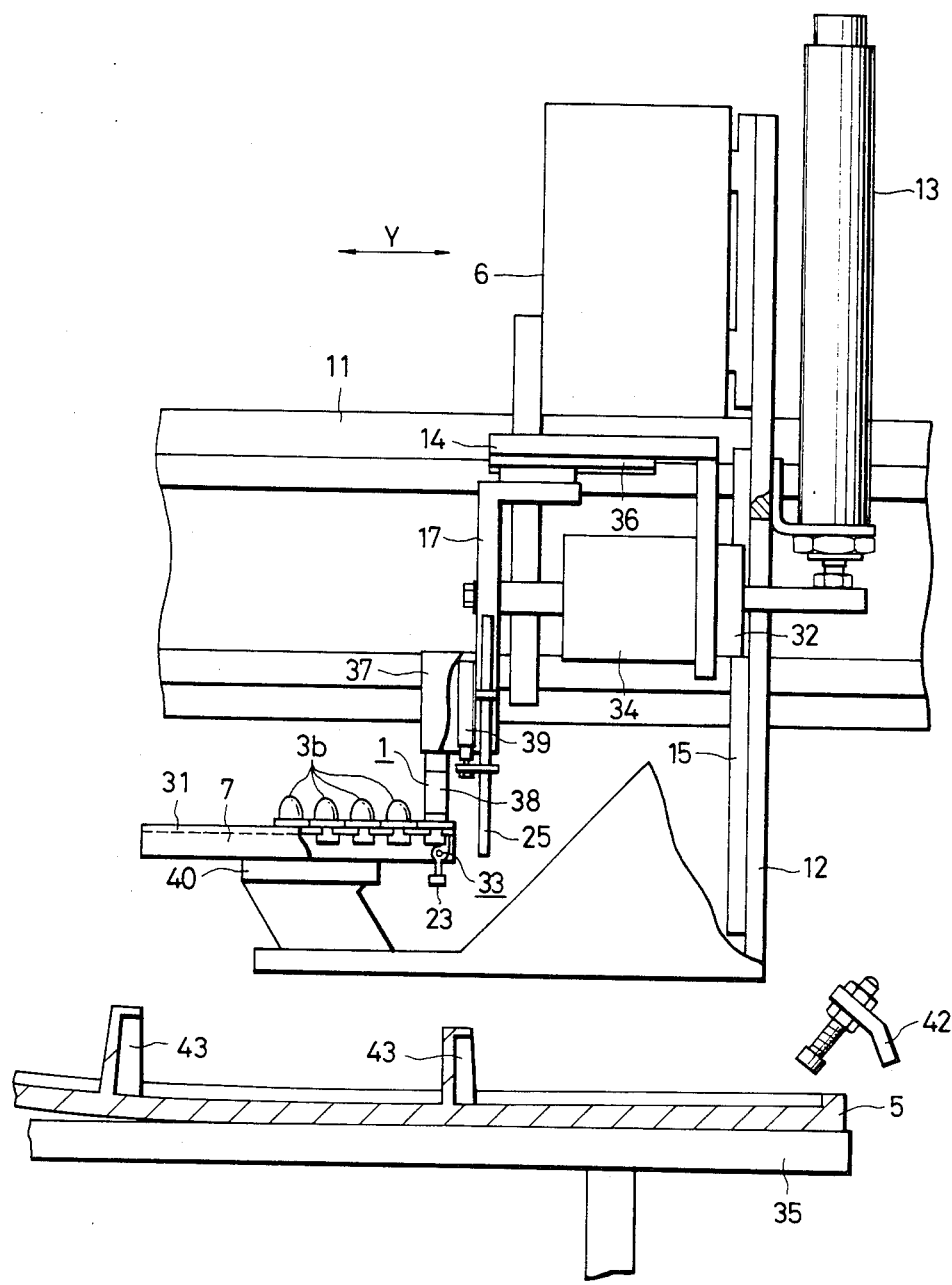
FIG. 12 is a side view of the principal portion showing a process in which parts are conveyed by the apparatus of FIG. 11.
Figure 13:
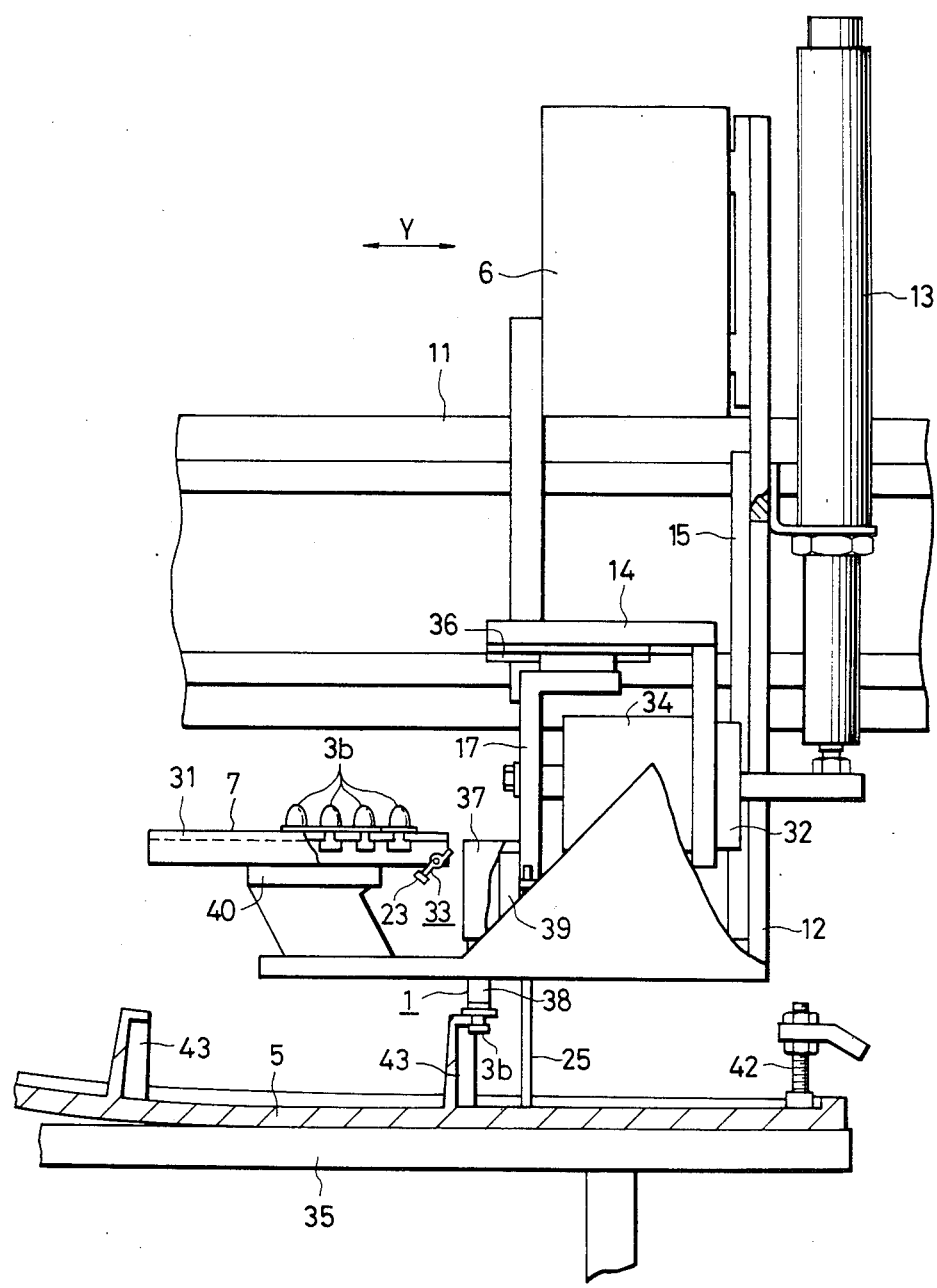
FIG. 13 is a side view of the principal portion showing a process in which parts are secured by the same.
Figure 14:
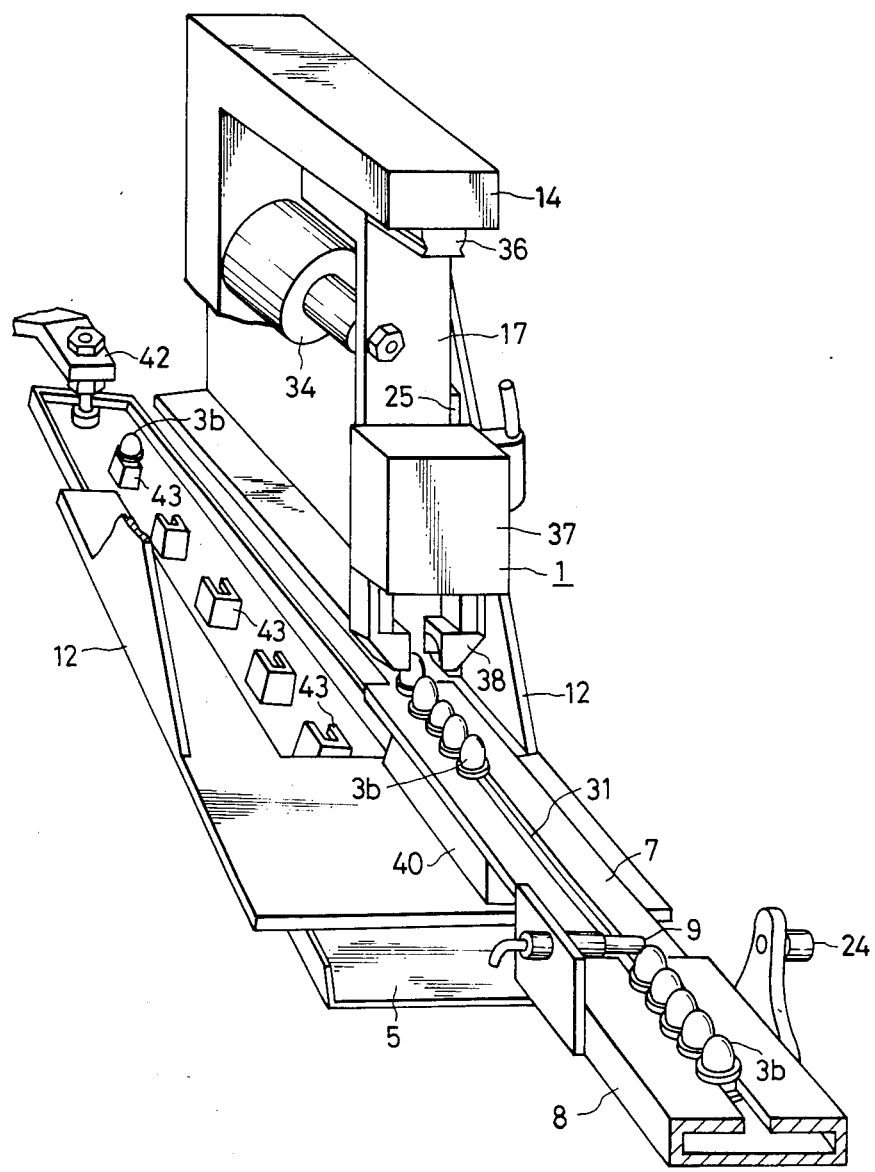
FIG. 14 is a perspective view of the principal portion of the apparatus of FIG. 11.

As shown in FIGS. 12 and 13, the hook-shaped first support member 12 is attached to the arm 6. The air cylinder 13 equipped with a rod vertically movable is installed on the rear side (on the right—hand sides of FIGS. 12 and 13) of the first support member 12, whereas the rail—like guide member 15 is installed vertically on the surface thereof.

A slide member 32 capable of sliding in the vertical direction as the air cylinder 13 operates is attached to the guide member 15 and the second support member 14 having an inverted L-shaped side is fixed to the slide member 32.

The third support member 17 is attached to the second support member 14 through an air cylinder 34 movable in the horizontal direction. The upper end of the third support member 17 is made to mate with a rail 36 formed on the under surface of the horizontal portion of the second support member 14 and slide as the air cylinder 34 moves while it is engaging with the rail 36.

The part securing means 1 is installed on the under surface of the third support member 17, the part securing means 1 comprising a box-like driving means 37 and two nipping claws 38 downwardly extending from the driving means 37.

An air cylinder 39 movable in the vertical direction is contained in the driving means 37 and a press bar 25 for pressing down the assembly body 5 is coupled to the air cylinder 39 and made movable in the vertical direction along the side of the third support member 17.

The conveyor means 7 fixed to the front end of the first support member 12 is used to collectively receive five clips 3b as a lot from the supply means 8 of the storage 4 and collectively carry them up the the neighborhood of the assembly body 5.

A groove 31 in which the plurality of clips 3b can be arranged is provided in the upper center of the conveyor means 7 and so arranged as to transfer the clips 3b received from the supply means 8 to the front end of the groove 31 by means of the vibrator 40.

The clip 3b thus transferred in the groove 31 is stopped at the front end of the groove 31 by a stopper 33 equipped with a weight 23 in its lower portion.

A trestle 35 is installed in the lower portion of the robot 2 and the assembly body 5 is mounted on the trestle 35, both end faces thereof being fixed by a clamp 42. The assembly body 5 is formed of a tray—like synthetic resin component with five clip seats 43 spaced apart from each other on the under surface thereof.

The functions and effects of this embodiment will subsequently be described. The assembly body 5 is mounted on the trestle 35 and fixed thereto with the clamp 42.

The vibrator 30 is operated so that the clips 3b may be supplied from the storage 4 to the supply means 8. When the clips 3b are arranged on the supply means 8, the arm 6 is moved by the transfer mechanism 11 to make the conveyor means 7 attached to the first support member 12 abut against the supply means 8.

The stopper 9 of the supply means 8 is opened and the clips 3b on the supply means 8 are moved up to the conveyor means 7 by means of the vibrators 30 and 40.

The arm 6 is then moved to transfer the conveyor means 7 close to the assembly body 5 fixed onto the trestle 35. The air cylinders 13 and 34 are operated so as to move the securing means 1 close to the clips 3b located at the front end of the conveyor means 7.

The driving means 37 of the securing means 1 is operated so that the clip 3b may be nipped by the nipping claws 38 (see FIG. 12). The air cylinders 13 and 34 are then so operated as to move back the third support member 17 and moved down toward the assembly body 5. As the securing means 1 is moved in the horizontal direction, it is located at a suitable height where the clip 3b can be inserted into the clip seat 43 thereby.

The press bar 25 is lowered by the air cylinder 39 contained in the driving means 37 to set the assembly body 5 stably on the trestle 35 (FIG. 13).

The air cylinder 34 is again operated so as to press the clip 3b nipped by the securing means 1 against the clip seat 43. The driving means 37 is then actuated so as to release the nip pressure applied to the clip 3b and secure the clip 3b to the clip seat 43.

The air cylinders 34 and 39 are then operated so as to return the securing means 1 to the first position where the securing means 1 is caused to nip the clip 3b on the conveyor means 7. This step of securing the clip 3b to the clip seat 43 of the assembly body 5 is repeated until the clips 3b equivalent to the lot thereof and conveyed by the conveyor means 7 have been secured thereto. Accordingly, the number of reciprocations required for conveying the clips 3b from the storage 4 to the assembly body 5 can be decreased or the time required therefor can be shortened. The part securing work productivity can ultimately be increased.

The application of the present invention is not limited to the above embodiments and it is applicable in the following manners:

(1) Other part securing means 1 may be usable as long as any of them is attached to a robot 2 and intended to convey parts 3 from a supply means 8 to a position where they must be secured to an assembly and also capable of securing them thereto. Motor hammers, E ring drivers, ultrasonic wave oscillator horns or the like may be used as the securing means 1.

(2) Any robot may be used as long as its arm 6 can be equipped with one or more than one part securing means 1, e.g., a robot having an arm horizontally rotatable whose angle of elevation is variable. The method of attaching the securing means to the arm 6 and that of moving it vertically may be designed voluntarily, e.g., the securing means 1 may be coupled directly to the arm 6 of the robot 2 and operated like fingers. The number of the part securing means may be one or more, and particularly may be desirable to be three to five.

As set forth above, the number of reciprocations required for the arm of the apparatus proper to move back and forth between the part storage and the part securing position can be decreased according to the present invention. Accordingly, the time thus saved may be appropriated to the actual working time necessary for securing parts to an assembly and an excellent effect brought about thereby is markedly improved part securing work productivity. Further, the energy necessary for moving the arm can be reduced.

I claim:

1. An apparatus for securing parts, comprising:
   a storage for storing a number of parts;
   a carrying means having an arm, a conveyor means and a tool for carrying said parts from said storage to an assembly body; and
   a supply means installed at said storage for supplying as a lot unit a plurality of said parts to said conveyor means,
   said tool being attached to one end of said arm for securing said parts to said assembly body, and
   said conveyor means being installed at the front end of said tool for receiving as a lot unit a plurality of said parts to said assembly body.

2. An apparatus for securing parts, comprising:
   a storage for storing a number of parts;
   a mechanical device for automatically driving parts, said device having an arm;
   a supply means installed at said storage for supplying as a lot unit a plurality of said parts;
   a conveyor means installed at said arm for receiving a plurality of said parts as a lot unit from said storage and conveying said lot of parts close to an assembly body to which said parts are to be secured; and
   a securing means installed at said arm for securing said lot of parts thus conveyed to said assembly body one after another.

3. An apparatus for securing parts as claimed in claims 1 or 2, wherein said conveyor means is provided with a groove where said parts are arranged in a row.

4. An apparatus for securing parts as claimed in claims 1 or 2, wherein said securing means is a screw tightening means.

5. An apparatus for securing parts as claimed in claims 1 or 2, wherein said securing means is a motor hammer means.

6. An apparatus for securing parts as claimed in claims 1 or 2, wherein said securing means is an E-ring driving means.

7. an apparatus for securing parts as claimed in claims 1 or 2, wherein said securing means is an ultrasonic horn means.

8. An apparatus for securing parts as claimed in claims 1 or 2, wherein said securing means is equipped with nipping claws for nipping said parts.

9. An apparatus for securing parts as claimed in claims 1 or 2, wherein said securing means receives one piece of part at a time from said conveyor means.

10. An apparatus for securing parts as claimed in claims 1 or 2, wherein a plurality of said conveyor means and said securing means are attached to said arm in pairs.

11. An apparatus for securing parts, comprising:
    a storage for storing a number of parts;
    a carrying means having an arm, a conveyor means and a tool for carrying said parts from said storage to an assembly body; and
    a supply means installed at said storage for supplying as a lot unit a plurality of said parts to said conveyor means,
    a plurality of tools attached to said arm for securing said parts to said assembly body; and
    a conveyor means installed at the front end of said tools for respectively receiving said parts of a kind different from each other from said supply means and conveying said parts to said assembly body.

* * * * *